US007930562B2

(12) United States Patent
Kohiyama et al.

(10) Patent No.: US 7,930,562 B2
(45) Date of Patent: Apr. 19, 2011

(54) METHOD OF AND APPARATUS FOR REPRODUCING INFORMATION, AND SECURITY MODULE

(75) Inventors: Kiyoshi Kohiyama, Kawasaki (JP); Toshiyuki Yoshitake, Kawasaki (JP); Yasuhiro Watanabe, Kawasaki (JP); Kiyonori Morioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 11/980,655

(22) Filed: Oct. 31, 2007

(65) Prior Publication Data

US 2008/0072076 A1 Mar. 20, 2008

Related U.S. Application Data

(63) Continuation of application No. 10/629,853, filed on Jul. 30, 2003.

(30) Foreign Application Priority Data

Jul. 30, 2002 (JP) ................................. 2002-221856

(51) Int. Cl.
H04L 9/06 (2006.01)
G06F 21/00 (2006.01)
H04L 9/32 (2006.01)
(52) U.S. Cl. ........................................ 713/193; 713/194
(58) Field of Classification Search .......... 713/189–194; 711/5, 2, 111, 152, 154, 163; 710/22, 200, 710/23, 308

See application file for complete search history.

(56) References Cited

U.S. PATENT DOCUMENTS

| 4,446,519 | A |   | 5/1984  | Thomas |
|-----------|---|---|---------|--------|
| 4,817,140 | A |   | 3/1989  | Chandra et al. |
| 5,113,383 | A |   | 5/1992  | Amemiya et al. ............ 369/33 |
| 5,418,852 | A |   | 5/1995  | Itami et al. |
| 5,421,006 | A |   | 5/1995  | Jablon et al. |
| 5,442,645 | A |   | 8/1995  | Ugon |
| 5,448,045 | A |   | 9/1995  | Clark |
| 5,499,295 | A |   | 3/1996  | Cooper |
| 5,524,229 | A |   | 6/1996  | Nozaki |
| 5,574,922 | A | * | 11/1996 | James ........................... 712/220 |
| 5,768,389 | A |   | 6/1998  | Ishii |
| 5,778,070 | A | * | 7/1998  | Mattison ....................... 713/191 |
| 5,812,663 | A |   | 9/1998  | Akiyama et al. |
| 5,883,958 | A |   | 3/1999  | Ishiguro et al. |

(Continued)

FOREIGN PATENT DOCUMENTS

EP    0 471 538 A2    2/1992

(Continued)

OTHER PUBLICATIONS

U.S. Office Action, mailed Jan. 5, 2009 and issued in parent U.S. Appl. No. 10/629,853.

(Continued)

Primary Examiner — Minh Dinh
Assistant Examiner — Venkat Perungavoor
(74) Attorney, Agent, or Firm — Staas & Halsey LLP

(57) ABSTRACT

An information reproducing apparatus of the present invention includes a secure module and a main memory. The information in the secure module can not be accessed from outside. The secure module reads, using a direct access method, information relating to software stored in the main memory. The secure module checks a falsification of the software by comparing the information read with the information stored in advance in the secure module.

2 Claims, 8 Drawing Sheets

U.S. PATENT DOCUMENTS

| | | | |
|---|---|---|---|
| 5,915,025 A | 6/1999 | Taguchi et al. | |
| 5,991,399 A | 11/1999 | Graunke et al. | |
| 6,006,328 A | 12/1999 | Drake | |
| 6,026,293 A | 2/2000 | Osborn | |
| 6,173,390 B1 | 1/2001 | Kotani | |
| 6,192,013 B1 | 2/2001 | Kimura et al. | |
| 6,192,484 B1 | 2/2001 | Asano | |
| 6,205,550 B1 | 3/2001 | Nardone et al. | |
| 6,260,172 B1 * | 7/2001 | Hazama | 714/773 |
| 6,289,455 B1 | 9/2001 | Kocher et al. | |
| 6,463,539 B1 | 10/2002 | Mochizuki | |
| 6,487,646 B1 | 11/2002 | Adams et al. | |
| 6,665,780 B1 | 12/2003 | Bradley | |
| 7,243,242 B2 | 7/2007 | Moriai | 713/300 |
| 7,373,521 B1 | 5/2008 | Kawahara | |
| 7,461,249 B1 | 12/2008 | Pearson | |
| 2001/0044886 A1 * | 11/2001 | Cassagnol et al. | 711/163 |
| 2002/0018384 A1 | 2/2002 | Sumitani et al. | |
| 2002/0060703 A1 | 5/2002 | Tsukada | |
| 2002/0083318 A1 | 6/2002 | Larose | |
| 2002/0087871 A1 * | 7/2002 | Ripley | 713/193 |
| 2002/0144133 A1 | 10/2002 | Krasinski et al. | |
| 2002/0169971 A1 | 11/2002 | Asano et al. | |
| 2002/0174336 A1 | 11/2002 | Sakakibara et al. | |
| 2002/0191764 A1 | 12/2002 | Hori | |
| 2003/0076957 A1 | 4/2003 | Asakan | |
| 2003/0126457 A1 | 7/2003 | Kohiyama | |
| 2003/0159037 A1 | 8/2003 | Taki et al. | |
| 2004/0006703 A1 | 1/2004 | Kitani et al. | |
| 2004/0153657 A1 | 8/2004 | Fujiwara | |

FOREIGN PATENT DOCUMENTS

| | | | |
|---|---|---|---|
| EP | 1 076 279 A1 | 2/2001 | |
| JP | 63-105545 | 5/1988 | |
| JP | 03-503220 | 7/1991 | |
| JP | 03-239032 | 10/1991 | |
| JP | 10-283190 | 10/1998 | |
| JP | 10-333902 | 12/1998 | |
| JP | 11-039158 | 2/1999 | |
| JP | 2001-500293 | 1/2001 | |
| JP | 2001-147898 | 5/2001 | |
| JP | 2001-154577 | 6/2001 | |
| JP | 2002-000885 | 1/2002 | |
| JP | 2002-116959 | 4/2002 | |
| JP | 2002-312221 | 10/2002 | |
| JP | 2003-058669 | 2/2003 | |
| JP | 2003-507784 | 2/2003 | |
| JP | 2003-507785 | 2/2003 | |
| JP | 2003-173215 | 6/2003 | |
| JP | 2003-198527 | 7/2003 | |
| JP | 2004-054834 | 2/2004 | |
| WO | WO97/16786 | 5/1997 | |
| WO | WO99/13615 | 3/1999 | |
| WO | 01/43342 | 6/2001 | |

OTHER PUBLICATIONS

U.S. Appl. No. 10/629,853, filed Jul. 30, 2003, Kiyoshi Kohiyama, Fujitsu Limited.
U.S. Appl. No. 11/980,395, filed Oct. 31, 2007, Kiyoshi Kohiyama, Fujitsu Limited.
U.S. Appl. No. 11/980,394, filed Oct. 31, 2007, Kiyoshi Kohiyama, Fujitsu Limited.
Office Action mailed Apr. 30, 2009 for co-pending U.S. Appl. No. 10/629,853.
Cohen, "Operating System Protection Through Program Evolution", Computers & Security, Oct. 12, 1993, No. 6, pp. 565-584.
U.S. Appl. No. 10/629,853, filed Jul. 30, 2003, Kiyoshi Kohiyama et al., Fujitsu Limited, Kawasaki, Japan.
[unassigned] (continuation 1), Oct. 31, 2007, Kiyoshi Kohiyama et al., Fujitsu Limited, Kawasaki, Japan.
[unassigned] (continuation 2), Oct. 31, 2007, Kiyoshi Kohiyama et al., Fujitsu Limited, Kawasaki, Japan.
US Office Action issued on Nov. 8, 2007 in related U.S. Appl. No. 10/629,853.
"Modern Operating Systems" by Andrew S. Tanenbaum, Second Edition, Prentice Hall, 2001 (cover and p. 246).
European Patent Office Communication, mailed Nov. 5, 2008 and issued in corresponding European Patent Application No. 03 254 734.1-2224.
U.S. Office Action, mailed Jun. 25, 2008, and issued in corresponding U.S. Appl. No. 10/629,853.
Office Action mailed Jun. 15, 2010; U.S. Appl. No. 10/629,853.
Office Action dated Aug. 6, 2010 issued in copending U.S. Appl. No. 11/980,395.
Japanese Office Action for corresponding Japanese Patent Application No. 2003-203751 dated Dec. 1, 2009.
David Aucsmith et al., Protecting Software Against Inverse Analysis and Flasification, Details of Tamper Resistant Software Technology, Nikkei Electronics, Nikkei Business Publications, Inc., published on Jan. 5, 1998, vol. 706, pp. 209 to 220.
Toshinari Suematsu et al., A Construction Method for SD Systems Which Make Use of the CMP, IPSJ SIG Technical Report, Information Processing Society of Japan, Published on Sep. 19, 1998, vol. 98, No. 85, pp. 41 to 48.
Japanese Decision of a Patent Grant issued in Japanese Application No. 2003-203751 dated Aug. 4, 2010.
Office Action dated Sep. 27, 2010 issued in copending U.S. Appl. No. 11/980,394.
Office Action dated Dec. 7, 2010 issued in U.S. Appl. No. 10/629,853.
Office Action dated Dec. 7, 2010 issued in U.S. Appl. No. 11/980,394.
Office Action (Advisory Action) dated Nov. 17, 2010 issued in U.S. Appl. No. 11/980,395.

* cited by examiner

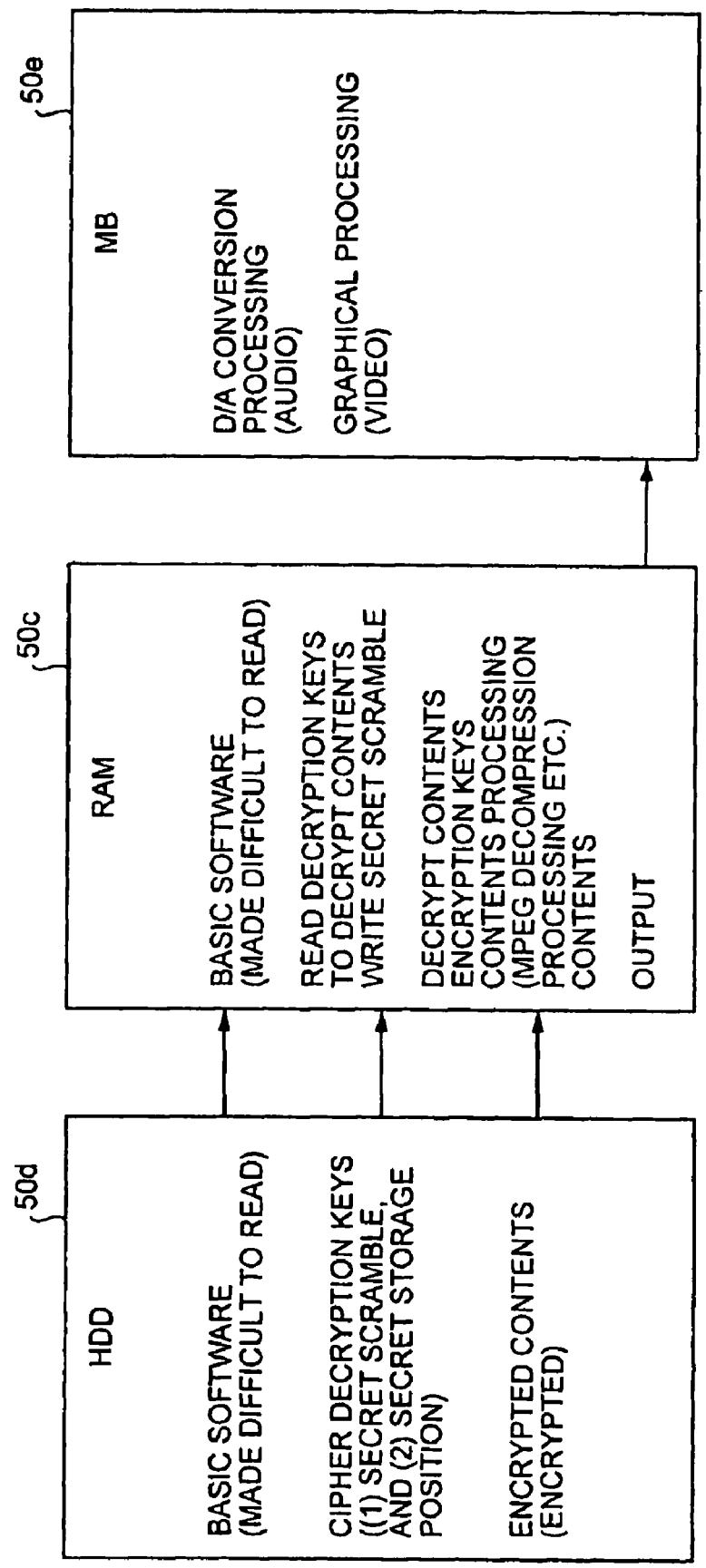

METHOD OF AND APPARATUS FOR REPRODUCING INFORMATION, AND SECURITY MODULE

CROSS REFERENCE TO RELATED APPLICATION

This application is a continuation of U.S. application Ser. No. 10/629,853 filed Jul. 30, 2003 which is currently pending.

BACKGROUND OF THE INVENTION

1) Field of the Invention

The present invention relates to a security module, a method of and an apparatus for reproducing information, which is downloaded via the Internet or information stored in a recording medium, by adding minimum hardware to a device having an open architecture such as a personal computer.

2) Description of the Related Art

In recent years, the broadband access to the Internet has become common and the digital broadcasting over the Internet has become popular. As a result, right-protection technologies that ensure the security of the distributed contents (mainly digital audio videos (AV)) have been attracting a great deal of attention.

A personal computer (PC) is an example of open architecture. As it is possible to peep into the contents of the personal computer, it has been considered difficult to realize the security of the contents.

However, the personal computer functions as a main gateway to and from the Internet. Therefore, if the contents in the personal computer can be secured, then it will be very advantageous because it will become possible to distribute the digital AV contents over the Internet.

A major approach to securing software, which need to be protected, in the personal computer has been to make the software difficult to read.

However, software is loaded onto the main memory of the personal computer when it is executed. It is easy to copy the software from the main memory while the software is in the main memory. Once the software is copied, it can then be analyzed at leisure.

Thus, the approach of making the software difficult to read does not give full protection. Therefore, it is not a wise idea to employ this approach where high protection is required.

FIG. 7 is a block diagram of a conventional system. This system includes a personal computer 50 that functions as an information reproducing apparatus, a network 51, a speaker 52, a display unit 53, and an input unit 54.

The personal computer 50 includes a central processing unit (CPU) 50a, a read-only memory (ROM) 50b, a random access memory (RAM) 50c, a hard disk drive 50d, a multimedia board (MB) 50e, two interfaces (I/F) 50f and 50g, and a bus 50h. The personal computer 50 decodes encrypted information that is downloaded via the network 51 or stored in the hard disk drive 50d, and outputs the decoded information to the speaker 52 and the display unit 53.

The CPU 50a executes various processes according to a program stored in the hard disk drive 50d. The CPU 50a also controls every section of the apparatus. The ROM 50b stores data and program that the CPU 50a executes. The RAM 50c temporarily stores the data and the program corresponding to specific process while the CPU 50a executes that processes.

The hard disk drive 50d stores the data and the program that the CPU 50a executes. The MB 50e decodes encrypted audio data and video data supplied from the CPU 50a, generates the original audio signal and video signal, and outputs these signals to the speaker 52 and the display unit 53.

The I/F 50f performs protocol conversion and data format conversion at the time of transmitting and receiving information via the network 51. The I/F 50g converts the data input from the input unit 54 into data having an internal format of the personal computer 50.

The bus 50h interconnects the CPU 50a, the ROM 50b, the RAM 50c, the hard disk drive 50d, the MB 50e, the I/F 50f, and the I/F 50g. These units can transmit and receive information to and from each other via the bus 50h.

The network 51 is, for example, the Internet. The speaker 52 converts the audio signal supplied from the MB 50e into audio and outputs the audio. The display unit 53 is a cathode-ray tube (CRT) monitor or a liquid crystal monitor, for example, and displays the video. The input unit 54 includes a mouse and/or a keyboard, for example.

FIG. 8 shows information flow in the personal computer 50. The hard disk drive 50d stores a basic software, decryption keys, and encrypted contents.

The basic software is used to decrypt the cipher of the encrypted contents. This software is made difficult to read to prevent it from being decrypted by a malicious user. For example, the process of making the software difficult to read, may be performed as follows.

Before the processing: $X=X+Y$

After the processing: $X=X*2+1+Y*2-1$ $X=X/2$ where X and Y are variables, and * indicates multiplication.

Although the result of the calculation before the processing and the result of the calculation after the processing are the same, decrypting the algorithm becomes difficult after the processing.

The decryption keys are keys used to decrypt the cipher applied to the encrypted contents. The decryption keys are stored at a secret position and are provided with a secret scramble. This prevents the keys from being easily stolen by a malicious user.

The encrypted contents are, for example, encrypted video, audio, and computer data.

The following steps of processing are executed to reproduce the encrypted contents:

(1) The basic software is read from the hard disk drive 50d and loaded onto the RAM 50c.

(2) The basic software is stored at a secret position and the decryption keys are read from the hard disk drive 50d. The decryption keys are broken into three to five parts and stored in separate secret positions. Moreover, it is not possible to obtain the keys unless a secret calculation is successfully solved.

(3) The encrypted contents are read from the hard disk drive 50d, and the cipher is decrypted with the decryption keys.

(4) If the decrypted contents are compressed contents, they are decompressed (Motion Picture Experts Group (hereinafter, "MPEG") decompression in case of video contents), and then stored into the buffer on the RAM 50c, and are output to the MB 50e.

(5) The MB 50e executes a digital-to-analog (D/A) conversion and a graphical processing of the input contents, and outputs the obtained audio signal to the speaker 52 and the video signal to the display unit 53. Thus, the contents are regenerated.

According to the conventional system, as the basic software is loaded onto the RAM 50c of the personal computer 50, there is a risk that a malicious user can decrypt and copy the software.

Even if all the software including the basic software stored in the hard disk drive 50d are encrypted, the decryption software used to decrypt the cipher exists somewhere in the personal computer 50. Therefore, if one analyses the decryption software and finds out the positions where the decryption keys are stored, even the basic software can be analyzed and the algorithm employed to make the personal computer safe (hereinafter, "right-protection algorithm") can be discovered.

There is a need, particularly in public networks, such as the networks of the broadcasting industry, of a processing method that makes it difficult to decrypt the contents even if the right-protection algorithm is discovered. Current digital television receivers, which function mainly on hardware, employ the encryption such as MULTI2, DES (Data Encryption Standard). Although quite a few people know how these algorithms work, it is extremely difficult to decrypt the cipher of the contents unless the decryption keys are known.

The encryption keys are stored in the hardware, and an arrangement is provided such that these encryption keys can not be read by software. Further, the digital television receiver has a decrypting circuit and contents processing circuits (such as an MPEG video decompressing circuit and an MPEG audio decompressing circuit) realized as hardware. As a result, it is extremely difficult for a user to peep into the contents.

Such digital television receivers have appeared in the market. The SKYPerfecTV! (a trademark) in Japan and the DIRECTV (a trademark) in the United States are examples of systems where such digital television receiver are used.

SUMMARY OF THE INVENTION

It is an object of the present invention to solve at least the problems in the conventional technology.

The information reproducing apparatus according to one aspect of the present invention includes a secure module that stores a first information, a memory that stores a second information. The memory can be accessed from outside, and a falsification checking unit is loaded on the secure module. The secure module can not be accessed from outside. The second information is read and written by a direct access method, and is compared with the first information stored in the secure module. A falsification of the second information stored in the memory is checked based on a result of this comparison.

The information reproducing method according to the present invention, includes a reading step, which is executed within a secure module, of reading second information stored in a memory. The secure module stores a first information, and the secure module can not be accessed from outside. The memory can be accessed from outside using a direct access method. There is further provided a falsification checking step of comparing the second information with the first information, and checking a falsification of the second information based on a result of the comparison.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 is a block diagram that explains about a secure function when the power source of a personal computer 100 shown in FIG. 1 is turned on;

FIG. 8 shows information flow in a personal computer 50 shown in FIG. 7.

DETAILED DESCRIPTION

Exemplary embodiments of an information reproducing apparatus, an information reproducing method, and a security module according to the present invention will be explained in detail below with reference to the accompanying drawings.

Figure 1:
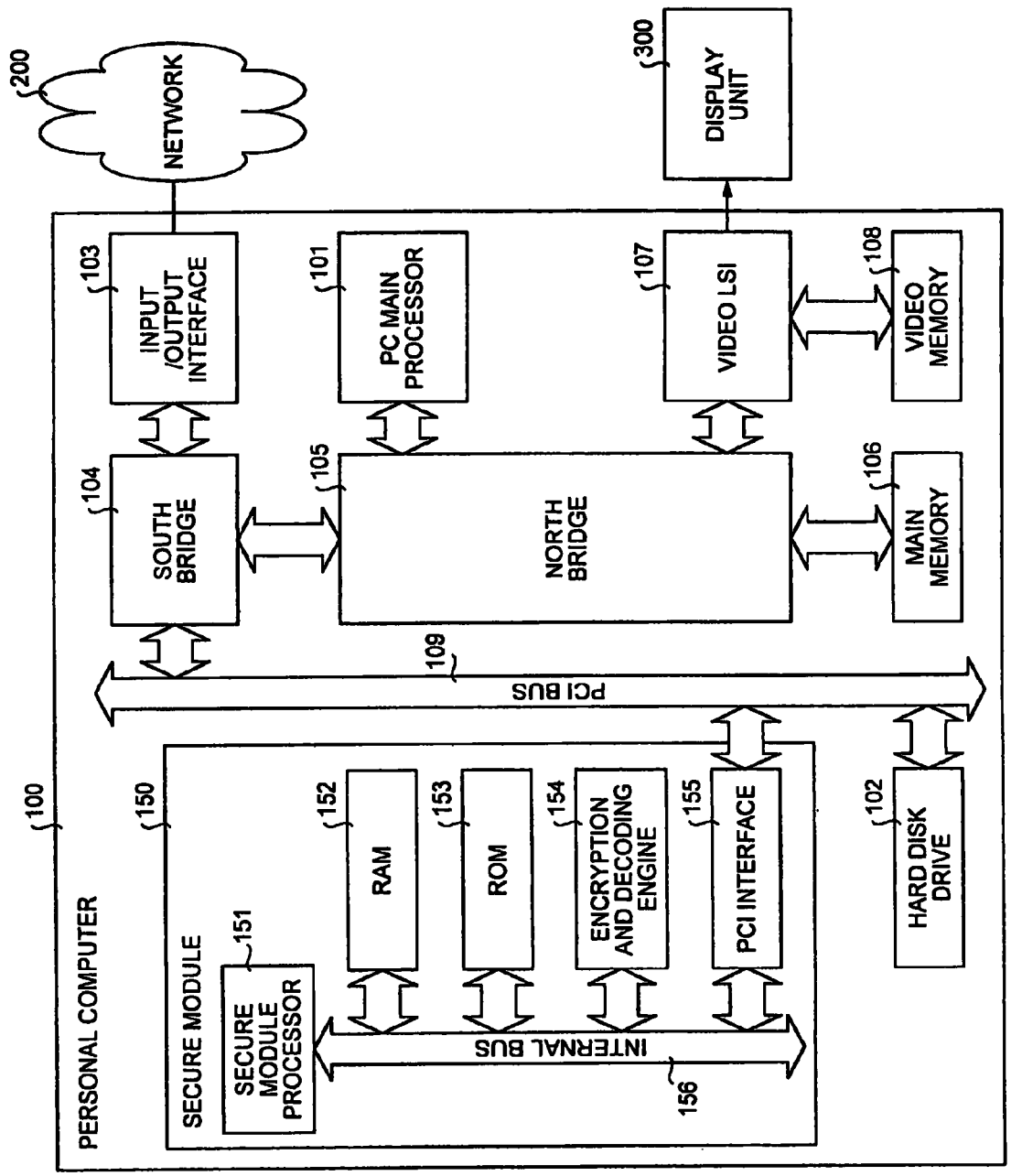
FIG. 1 is a block diagram of a system according to an embodiment of the present invention.

FIG. 1 is a block diagram of a system according to one embodiment of the present invention. This system includes a personal computer 100, a network 200, a display unit 300, a not shown input unit, and a not shown speaker.

The personal computer 100 functions as an information reproducing apparatus, and includes a PC main processor 101, a hard disk drive 102, an input/output interface 103, a south bridge 104, a north bridge 105, a main memory 106, a video large-scale integrated circuit (LSI) 107, a video memory 108, a peripheral component interconnect (PCI) bus 109, and a secure module 150.

The personal computer 100 decodes encrypted information (i.e., contents) that is downloaded via the network 200 or encrypted information (i.e., contents) that is stored in the hard disk drive 102, and outputs the decoded information to the display unit 300 and the speaker.

The PC main processor 101 executes various kinds of operational processing according to secure software stored in the hard disk drive 102 or other software, and controls various sections of the apparatus.

The secure software corresponds to secure software 180 shown in FIG. 2 to FIG. 5 described later, and provides an environment that is secure for the reproduction of the information. This secure software is loaded on the main memory 106.

Figure 2:
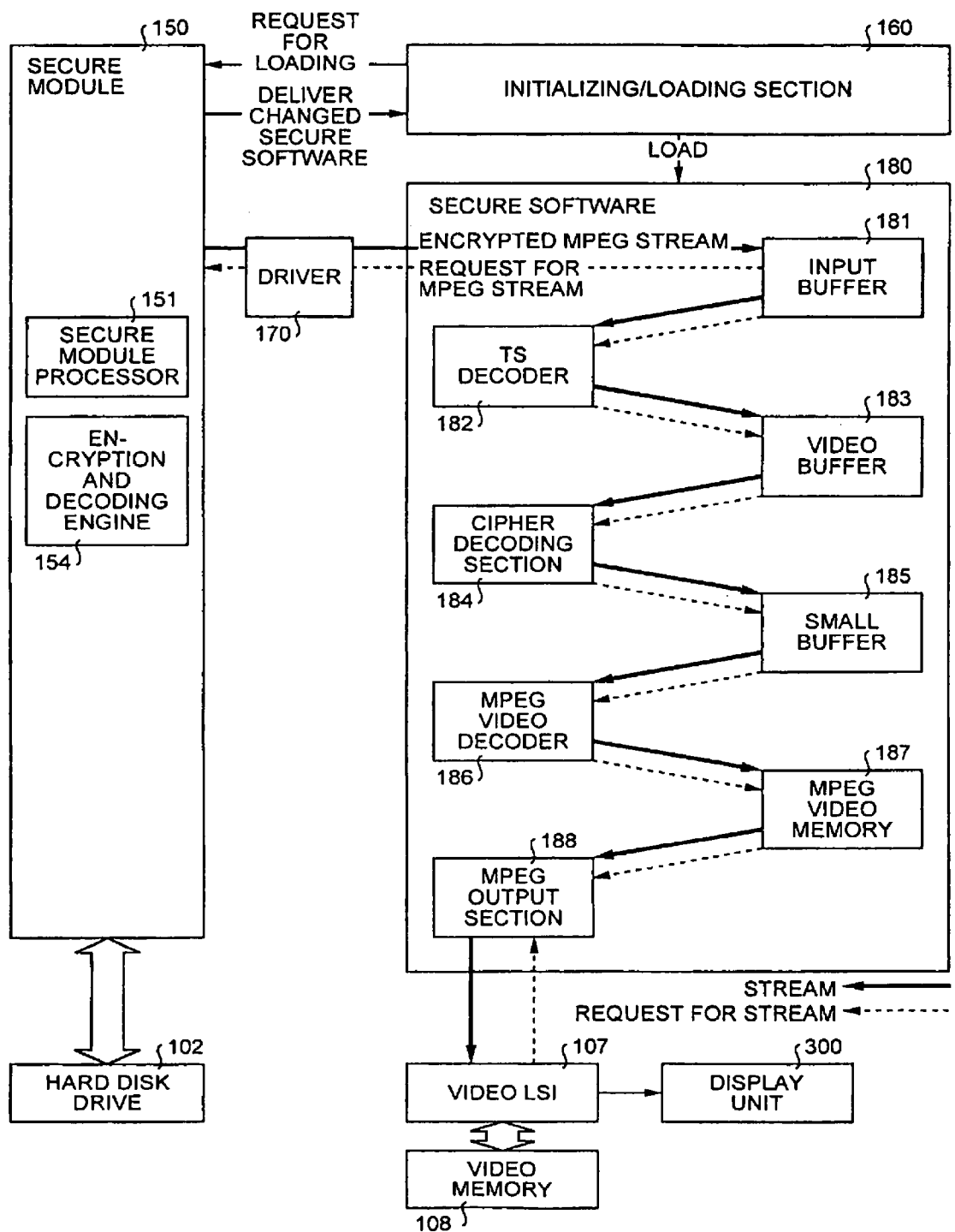

The hard disk drive 102 is a large-scale memory for storing the secure software 180 shown in FIG. 2 and other software that the PC main processor 101 executes.

The input/output interface 103 is used to transmit and receive information (i.e., contents) via the network 200, and performs protocol conversion and data format conversion.

The south bridge 104 has a bridge circuit is incorporated in it and functions as an interconnection between the input/output interface 103 and the PCI bus 109. The north bridge 105 functions as an interconnection between the PC main processor 101, the main memory 106, and the video LSI 107, and as a bridge for the data between these sections. The south bridge 104 and the north bridge 105 are interconnected via a high-speed bus.

The main memory 106 is, for example, a RAM. The secure software 180 and other software are loaded in this main memory 106. When the PC main processor 101 executes the secure software 180, the functions of blocks within the secure software 180 shown in FIG. 2 to FIG. 5 are realized.

The secure software 180 is loaded on the main memory 106. The PC main processor 101 executes this secure software 180, thereby to realize the function of decoding the MPEG data encrypted in the secure environment, in cooperation with the secure module 150.

The video LSI 107 stores the decoded video information in the video memory 108, and displays the videos on the display unit 300. The video memory 108 stores the video information under the control of the video LSI 107.

The PCI bus 109 is an interconnection between the hard disk drive 102, the south bridge 104, and a PCI interface 155 of the secure module 150.

The secure module 150 is hardware having a tamper resistant module (TRM) structure, that prevents a user from peeping into the contents from the outside, and prevents tampering of the inside data.

The TRM structure refers to a structure that physically and logically defends the internal analysis and tampering of semiconductor chips (i.e., the secure module 150). Specifically, the secure module 150 is internally provided with a coating that has strong adhesive force. When the surface of this coating is removed, the inside circuit is completely destroyed or a dummy wiring gets activated.

The secure module 150 has multiple functions. It reads the secure software 180 shown in FIG. 2 to FIG. 5 from the hard disk drive 102, irregularly rewrites the secure software 180 loaded on the main memory 106, irregularly changes positions of various kinds of buffers set in the main memory 106, and also performs encryption and decoding.

The secure module 150 includes a secure module processor 151, a RAM 152, a ROM 153, an encryption and decoding engine 154, a PCI interface 155, and an internal bus 156. The secure module processor 151 executes the firmware stored in the ROM 153 to realize various functions of the secure module 150.

The RAM 152 temporarily stores data and a program to be executed when the secure module processor 151 executes various kinds of operational processing. The RAM 152 stores decryption keys and the like. The ROM 153 stores data and basic firmware to be executed by the secure module processor 151.

The encryption and decoding engine 154 realizes the encryption function and the decoding function. The PCI interface 155 interfaces with each section via the PCI bus 109. The internal bus 156 interconnects the secure module processor 151, the RAM 152, the ROM 153, the encryption and decoding engine 154, and the PCI interface 155.

FIG. 2 to FIG. 5 are functional show block diagrams illustrating functions realized using the secure software 180 and various kinds of software. These functions include, for example, an initializing/loading section 160, a driver 170, an input buffer 181, . . . , and an MPEG output section 188. In these figures, the sections that perform same or similar functions or have same or similar configuration as those in FIG. 1 have been attached with like reference numerals.

The initializing/loading section 160 shown in FIG. 2 exists in the main memory 106, and searches for a free area in the main memory 106, and loads software onto this free area. In actual practice, the PC main processor 101 executes software to realize the function of the initializing/loading section 160.

The initializing/loading section 160 also links the software with other application software (not shown) of the personal computer 100, whenever necessary.

In the personal computer 100, an operating system (not shown) allocates execution time for each software, when other application software and the secure software 180 execute simultaneously in a multitask environment under the control of the operating system.

The initializing/loading section 160 notifies the operating system about information of a memory area on which the secure software 180 is loaded, and controls to allocate execution time for the secure software 180.

For example, the operating system schedules the execution of the software such that after the secure software 180 operates for 100 milliseconds, other software operates for 100 milliseconds.

The reason why the initializing/loading section 160 works with the operating system is that to operate the secure software 180 as one of a plurality of tasks (i.e., programs) under the control of the operating system, the assistance of the operating system that coordinates various processes is necessary.

The driver 170 corresponds to normal driver software that operates under the control of the operating system. Large-scale information (such as an encrypted MPEG stream) is transmitted and received between the secure module 150 and the secure software 180 (i.e., the input buffer 181) via the driver 170.

In other words, by utilizing the driver 170, it becomes possible to use various kinds of functions supported by the operating system.

It is a basic assumption that information other than the encrypted MPEG stream is transmitted and received between the secure module 150 and the secure software 180 by a direct access method such as a direct memory access (DMA). In other words, to exchange information other than the encrypted MPEG stream, the secure module 150 and the secure software 180 directly access each other without using the driver 170.

In the case of direct memory access, there is a disadvantage that it is not possible to utilize various kinds of services that the operating system provides to the driver 170.

However, in this case, the secure module 150 and the secure software 180 are not under the control of the operating system, and can exchange information between each other in the environment where the operating system has no concern. Therefore, there is a large merit that it is possible to obtain an increased level of security.

For example, when the secure module 150 and the secure software 180 exchange information between them via the driver 170, an interrupt is sent to the operating system. Based on this interruption, other software can sequentially "peep" into the information, which lowers the level of security. Among various kinds of drivers, there are some drivers having a function of transferring the information to other software.

On the other hand, when the secure module 150 and the secure software 180 exchange information between each other by the direct access method without using the driver 170, no interruption occurs in the operating system.

Therefore, when other software "peeps" into the information, it is always necessary to monitor the state of the secure software 180 by polling. In other words, it is always necessary to analyze the state of buffers in the main memory 106, and check whether the information in the buffers has been updated. When the information has been updated, the information has been "peeped" into.

However, in the case of using the direct access method, it is not known when the information reaches the secure software 180 from the secure module 150, and therefore, it is substantially impossible to carry out the polling. Even if it is possible to "peep" into a part of the information by polling, it is impossible to "peep" into the whole data.

The reason why the encrypted MPEG stream is transmitted via the driver 170 in the present embodiment is as follows. As the MPEG stream is encrypted, it is considered that security is ensured even when the MPEG stream is stolen. Priority is placed on efficiently delivering the encrypted MPEG stream to the secure software 180 by utilizing the function of the driver 170.

The input buffer 181 is set in an area in the main memory 106, and stores the encrypted MPEG stream. ATS decoder 182 reads the encrypted MPEG stream (more precisely, an MPEG-TS stream) from the buffer 181 at the request of a decoding section 184, and stores encrypted MPEG video information into a video buffer 183 after TS decoding the encrypted MPEG stream.

The TS decoding is a processing to extract compressed encrypted MPEG video information from the encrypted MPEG stream. The encrypted MPEG stream includes, in a time-division multiplexed format, (1) encrypted MPEG video information, (2) encrypted MPEG audio information, and (3) broadcast information (such as a title of a program, an airtime, an outline of the program, a per-program fee, and the like) constructed of the encrypted MPEG video information and the encrypted MPEG audio information.

In the actual secure software, it is necessary to decode both the encrypted MPEG video information and the encrypted MPEG audio information. It is needless to mention that to decode the encrypted MPEG audio information, a program that is the same kind as the program for decoding the encrypted MPEG video information is necessary.

The TS decoder 182 always monitors the scale of the input buffer 181, and requests the secure software 180 to replenish the input buffer 181 when the capacity of the input buffer 181 drops below a specific level.

The video buffer 183 is set in an area in the main memory 106, and stores the encrypted MPEG video information. This video buffer 183 corresponds to a VBV buffer determined in the MPEG video international standard.

The cipher decoding section 184 reads the encrypted MPEG video information from the video buffer 183 at the request of an MPEG video decoder 186, and decodes the encrypted MPEG video information until a small buffer 185 becomes full. The cipher decoding section 184 stores the decoded compressed MPEG video information into the small buffer 185.

The small buffer 185 is set in an area in the main memory 106, and stores the compressed MPEG video information. The MPEG video decoder 186 recognizes that the MPEG output section 188, at the later stage, has output the video information.

After the video information has been output, an MPEG video memory 187 has a free area corresponding to this information component. Therefore, the MPEG video decoder 186 reads the next piece of compressed MPEG video information from the small buffer 185, decompresses (i.e., decodes) this information, and stores the decompressed MPEG video information into the MPEG video memory 187.

The small buffer 185 is set to be able to store only a small quantity of compressed MPEG video information (i.e., less than one image). This setting is made in order to avoid storing the decoded compressed MPEG video information in the main memory 106, which is very risky from the viewpoint of security.

Therefore, the small buffer 185 does not store the compressed MPEG video information of one image, and becomes "free" soon after the MPEG video decoder 186 has decoded the information.

The MPEG video decoder 186 issues a decoding request to the cipher decoding section 184 at a point of time when the small buffer 185 becomes "free" or when the quantity of information in the small buffer 185 becomes smaller than a threshold value set in advance, and makes the small buffer 185 store compressed MPEG video information.

The MPEG video memory 187 stores the video information corresponding to four frames, that is, information corresponding to a four-thirtieth second component (i.e., approximately 133 milliseconds), for example. The MPEG output section 188 reads the decompressed (i.e., decoded) video information (corresponding to one piece of image or one frame) from the MPEG video memory 187, and transfers this video information to the video LSI 107 using DMA transfer. Here, the DMA transfer method is used to transfer the video information from the MPEG output section 188 to the video LSI 107 at a high speed.

The encrypted MPEG video information is stored into the video buffer 183 set in the main memory 106, and is decoded part by part while storing the decoded information into the small buffer 185.

Figure 3:
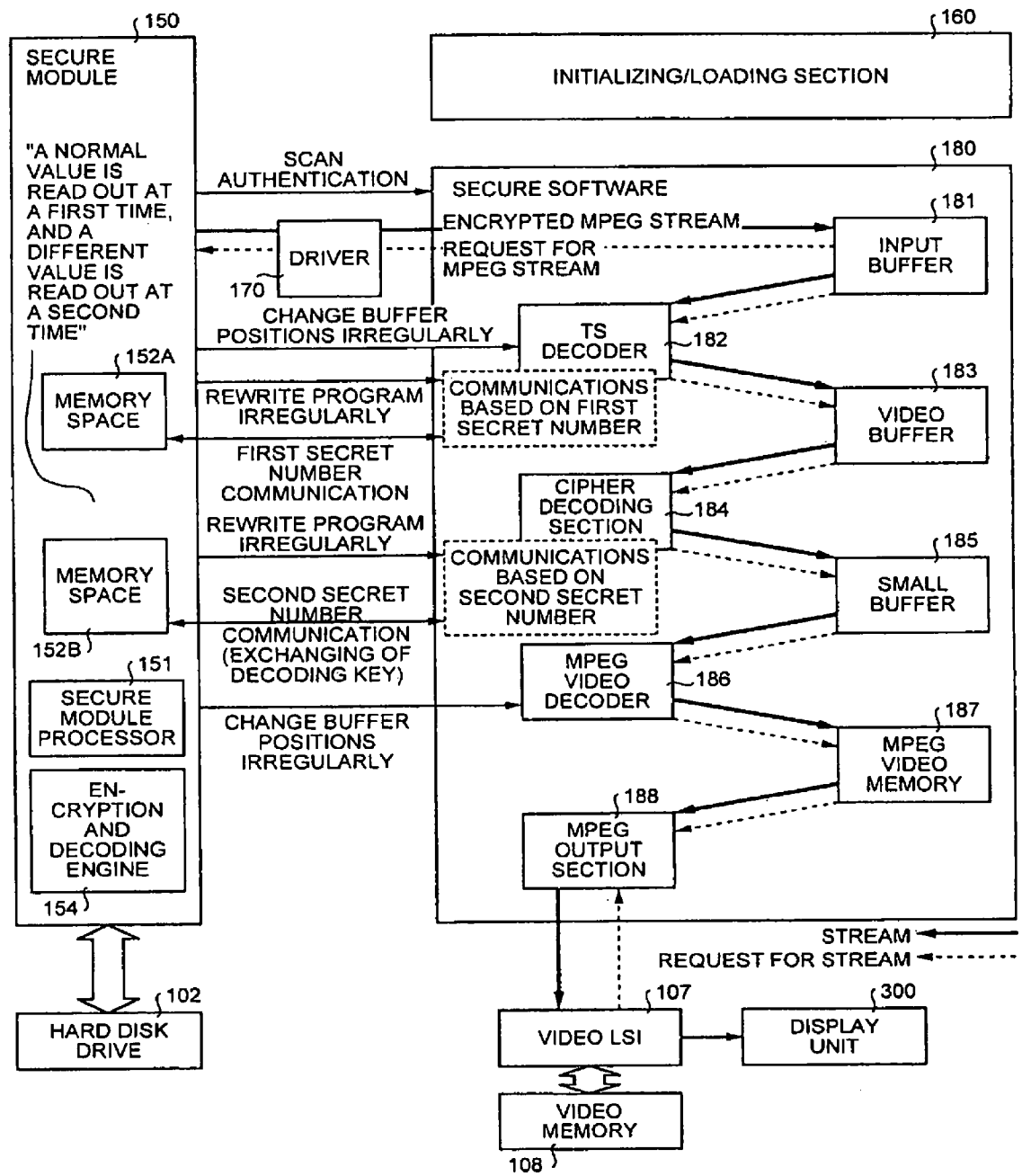
FIG. 3 is a block diagram that explains about a secure function when the personal computer 100 carries out a normal operation.

In the secure module 150 shown in FIG. 3, a memory space 152A is set in the RAM 152 shown in FIG. 1, and is used for a first secret-number communication that is executed between the secure module 150 and the TS decode 182.

The secure module processor 151 in the secure module 150 controls the memory space 152A such that a normal value is read at a first time and a different value is read at a second time.

A memory space 152B is set in the RAM 152 shown in FIG. 1, and is used for a second secret-number communication that is executed between the secure module 150 and the cipher decoding section 184.

The secure module processor 151 in the secure module 150 controls the memory space 152B such that a normal value is read at a first time and a different value is read at a second time, in a manner similar to that for the memory space 152A.

The secure function when the power source is turned on in the personal computer 100 shown in FIG. 1 will be explained with reference to FIG. 2.

FIG. 2 shows a state when the initializing/loading section 160 loads the secure software 180 from the secure module 150 onto the main memory 106 when the power source of the personal computer 100 is turned on.

When the power source of the personal computer 100 is turned on, the operating system is started, and a list of software (i.e., programs, applications, and the like) that can be executed is displayed on a desktop (not shown).

By referring to the list, a user executes the secure software 180, for example, as desired software. Specifically, the user clicks the icon corresponding to the secure software 180 displayed on the desktop, thereby to start execution of the secure software 180.

In other words, the initializing/loading section 160 requests the secure module 150 to load the secure software 180. While an ordinary initializing/loading section directly loads software from the hard disk drive 102, the initializing/loading section 160 in the present embodiment loads the software via the secure module 150.

The secure module processor 151 in the secure module 150 reads the secure software 180 from the hard disk drive 102, and changes a specific portion (such as a portion at which a secret number is described) of the secure software 180. The secure module 150 transfers the changed secure software 180 to the initializing/loading section 160.

The initializing/loading section 160 searches for a free area in the main memory 106, and loads the changed secure software 180 onto the free area.

It is assumed that the secure module 150 directly accesses the memory space on the personal computer 100 using DMA transfer, and it is necessary that this memory space is an unswappable area in the main memory 106. The function of the operating system is utilized to secure an unswappable area.

If the secure software 180 is loaded onto a swappable area, there is a possibility that the secure software 180 may get automatically swapped from the main memory 106 into a memory space of the hard disk drive 102, as a result of the function of the operating system.

The swapping of the software occurs because when a plurality of software operate at the same time, it is not possible to load all the software onto the main memory 106 of the personal computer 100.

In this case, there is a possibility that the secure software 180 does not exist in the main memory 106 when required, and a problem occurs that the secure module 150 cannot directly access the memory space using DMA transfer.

In the present embodiment, the secure module 150 is loaded into an unswappable area at the time of loading the secure software 180 thereby to enable the secure module 150 to understand the loading position of the secure software 180 at all times. The above explains about an example operation from the time of the turning on of the power source until the loading of the secure software 180 onto the main memory 106.

As explained above, the initializing/loading section 160, used when the power source is turned on, can link with the operating system. Therefore, it becomes possible to change all of (1) the program buffer area, (2) the total program code, and (3) the memory area in which the program exists.

The secure function when the personal computer 100 shown in FIG. 1 carries out a normal operation after the power source of the personal computer 100 is turned on will be explained with reference to FIG. 3.

The secure software 180 is loaded on the main memory 106 of the personal computer 100.

In this case, the secure software 180 carries out the following operation. In FIG. 3, it is considered that the display unit 300 finally consumes the visual information, and the display unit 300 is linked with the video LSI 107.

When the video LSI 107 finishes displaying the video on the display unit 300, the video LSI 107 requests the secure software 180 to prepare for displaying the next video. The MPEG output section 188 reads the video information (corresponding to one piece of image) from the MPEG video memory 187, and transfers this to the video LSI 107 using DMA transfer.

The cipher decoding section 184 reads encrypted MPEG video information from the video buffer 183 at the request of the MPEG video decoder 186, and decodes the encrypted MPEG video information until the small buffer 185 becomes full. For decoding the information, the cipher decoding section 184 receives a decoding key from the secure module 150.

The decoding key is valid for only a limited period of time such as a few seconds. Thereafter, the cipher decoding section 184 needs to obtain a new decoding key from the secure module 150. The algorithm that the cipher decoding section 184 receives a decoding key from the secure module 150 may be included in a second secret-number communication to be described later.

Based on this, the secure module 150 can confirm that the secure software 180 has a secret number, and can provide the secure software 180 with the decoding key in security.

The cipher decoding section 184 continuously monitors the remaining quantity of the encrypted MPEG video information in the video buffer 183. When the quantity drops below a specific level, the cipher decoding section 184 requests the TS decoder 182 to replenish encrypted MPEG video information.

The TS decoder 182 reads an encrypted MPEG stream after receiving the request from the cipher decoding section 184, and carries out the TS decoding. The TS decoder 182 stores the encrypted MPEG video information into the video buffer 183.

The TS decoder 182 always monitors the scale of the input buffer 181. When the scale drops below a specific level, the TS decoder 182 requests the secure module 150 to replenish an encrypted MPEG stream.

When the secure module 150 receives such a request it reads the encrypted MPEG stream from the hard disk drive 102. The encryption and decoding engine 154 of the secure module 150 decodes the encrypted MPEG stream once, and encodes this MPEG stream again with another encoding key. The secure module 150 provides the secure software 180 with the encrypted MPEG stream obtained after this re-encryption.

The reason why the MPEG stream is encrypted again is that it is risky to directly provide the secure software 180 with the encrypted MPEG stream read from the hard disk drive 102. The provision of this MPEG stream as it is leads to the need to deliver the decoding key to the secure software 180. This has the lowest security in the personal computer 100.

On the other hand, when the secure module 150 has re-encrypted the MPEG stream, the secure module 150 does not provide the secure software 180 with the encrypted MPEG stream that is stored in the hard disk drive. Instead, the secure module 150 provides the secure software 180 with this re-encrypted MPEG stream that has been prepared for the secure software 180 so that only the secure software 180 can use this re-encrypted MPEG stream.

Therefore, it is less risky to use the re-encrypted MPEG stream, instead of the encrypted MPEG stream stored in the hard disk drive 102 which can be read out anytime.

In FIG. 3, in parallel with the above operation, the following four processing steps (1) to (4) are executed to confirm the security of the secure software 180. In this operation, the secure module 150 carries out various actions on the secure software 180 and receives response from the secure software 180.

(1) a scan authentication processing
(2) an irregular rewriting of the program
(3) an irregular rewriting of the buffer positions (4) secret-number communication The secure module 150 executes the processing (1) to (3), and both the secure module 150 and the secure software 180 execute the processing (4).

The processing (1) to (4) will be explained below. The scan authentication processing in (1) will be explained first.

In the scan authentication processing, the secure module 150 directly accesses a part or the whole area of the main memory 106 in which the secure software 180 in operation is loaded using DMA transfer, and reads out a part or the whole data of the secure software 180.

The secure module 150 compares the read data with the data stored in advance in the RAM 152 shown in FIG. 1, and authenticates the data based on whether both data are consistent. When a malicious user has falsified the secure software 180, the program has been rewritten. Therefore, the data cannot be authenticated.

On the other hand, when the secure software 180 has not been falsified, both data are consistent, and the data is authenticated.

As an example method of authenticating the data, the secure module 150 stores into the RAM 152 the contents that are the same as the secure software 180. The secure module 150 directly reads the secure software 180 from the main memory 106 using DMA transfer, and compares the read secure software 180 part by part with the contents stored in the RAM 152.

When the memory capacity of the RAM 152 of the secure module 150 is too small to store all the secure software 180, a scan authentication processing such as a checksum method may be used.

In other words, only a sum of all the codes of the secure software 180 is stored into the RAM 152, and the secure software 180 is read out using DMA transfer. The sum of the codes is compared with the contents stored in the RAM 152. When both data are consistent after addition, it is decided that the secure software 180 has not been falsified (i.e., the data is authenticated).

According to the scan authentication, the secure module 150 having no relation with the secure software 180, independently detects falsification by directly accessing the main memory 106 in which the secure software 180 is loaded.

Further, according to the scan authentication, the secure module carries out the detection without using the operating system at all. Therefore, this method ensures security against falsification or peeping that is carried out by utilizing the function of the operating system.

On the other hand, when the secure module 150 carries out the detection via the operating system, there is a high risk that a malicious user can easily know "when the scan authentication processing is carried out" based on the interruption information that is notified to the operating system.

In the irregular rewriting of the program in (2), during the operation of the secure software 180, the secure module processor 151 in the secure module 150 directly writes in real time, using DMA transfer or the like, into the memory area of the main memory 106 in which the secure software 180 is loaded.

While the scan authentication processing in (1) is based on the reading operation, the processing of irregularly rewriting the program in (2) is based on the writing operation. Specifically, the secure module 150 rewrites a part of the program such as the secure software 180 without using the operating system in such a manner that the operating system is not aware of this rewriting.

Based on this, when a scan authentication processing is carried out afterward, the authentication result changes in real time even during the period while the secure software 180 is operating. Therefore, the security of the scan authentication improves.

A combined effect obtained due to the scan authentication and the irregular rewriting of the program will now be explained. In FIG. 2, a "program for carrying out secret number communication" in the secure software 180 is rewritten.

In this case, the program is rewritten in real time, and, thereafter, the scan authentication processing is performed on the code of the rewritten program. Therefore, the security of the scan authentication processing improves. No matter how shrewd a malicious user (a hacker) is, it is very difficult to hack the program that changes in real time.

According to the present embodiment, it is also possible to confirm that the program actually in operation has been rewritten by verifying the actual operation of the rewritten program. This is effective against the following attack.

In order to deceive the scan authentication, a malicious user may carry out the following attack. The user loads onto the main memory 106 of the personal computer 100, two kinds of secure software including "secure software a" that deceives the scan authentication and "secure software b" that actually operates in parallel. The user makes the "secure software a" execute the scan authentication, and rewrites the "secure software b".

The purpose of the scan authentication is to make it impossible to rewrite the program. However, using the deceiving "secure software a", the malicious user can freely rewrite the "secure software b", thereby to deceive the scan authentication.

At the time of loading the secure software 180, the initializing/loading section 160 also notifies the secure module 150 of the memory area onto which this software is loaded.

In this case, the initializing/loading section 160 notifies the secure module 150 of a memory area onto which the "secure software a" is to be loaded. Based on this, the user can carry out the above attack.

On the other hand, according to the present embodiment, a part or the whole secure software 180 is rewritten in real time, and the actual operation of the secure software 180 is changed based on the result of the rewriting. The secure module 150 detects this change. Therefore, it is possible to further improve the security of the secure software 180.

What is changed in the present embodiment is a "secret-number communication program" that is included in the secure software 180. The secure module 150 and the secure software 180 communicate with each other using a "secret number", based on which the secure module 150 confirms the security of the secure software 180.

For example, the secure module 150 notifies the secure software 180 of a secret number, and thereafter, the secure software 180 returns a normal secret number to the secure module 150.

When a number other than the normal secret number is returned to the secure module 150, the secure module 150 decides that the secure software 180 has been falsified. The secret number may be a number sequence generated using a plurality of numerical values.

As explained above, according to the present embodiment, the secure module 150 directly performs the scan authentication on the secure software 180 using DMA transfer or the like. The secure module 150 rewrites a part of the code in real time, and confirms that the code works. Based on this, it is possible to prevent the above attack.

The above explains about a structure example of detecting a "deceiving" program. When the secure module 150 detects the "deceiving", the secure module 150 stops providing the decoding key to the cipher decoding section 184 of the secure software 180.

A plurality of decoding keys exist in the secure module 150, and each decoding key is valid for only a few seconds. Therefore, when the provision of the decoding key is stopped, in a few seconds, the secure software 180 becomes unable to carry out a series of processing relating to the encrypted MPEG stream.

The irregular rewriting of the buffer positions in (3) will be explained. The processing of (3) is a countermeasure against the "peep" attack, and uses the real time updating of the buffers (i.e., data areas) that the secure software 180 uses while confirming the security of the secure software 180 based on the processing of (1) and (2).

The "peep" is the operation whereby, any other program operating at the same time (in time division) with the main program "peeps" into the data area in the secure software 180, and steals the information.

Any program that operates in time division can "peep" into the memory space in the personal computer 100. This is because the current processor is designed to be able to access any memory area, and there is no mechanism of controlling the access to the memory space for individual programs.

While it is recently possible in some cases to control the memory space for individual programs at the operating system level, this control is not sufficient. A malicious user can easily "peep" into other memory space. By analyzing the structure of the secure software 180, the user can find out where the important data exists, and steal data by "peeping" into the memory space.

For example, in the secure software 180 shown in FIG. 3, when positions of the input buffer 181, the video buffer 183, the small buffer 185, and the MPEG video memory 187 (to be collectively referred to as buffers) are specified, it is possible to steal the MPEG stream information by "peeping" into the memory space.

Particularly, a malicious user can easily attack the small buffer 185 in which the decoded original compressed MPEG video information is stored. The MPEG video memory 187 stores a large volume of decoded video information.

Therefore, even when the position of the MPEG video memory 187 is specified, it is difficult to steal the visual information by accumulating this information into the hard disk drive 102, considering the data transfer speed of the hard disk drive 102 and that of the PCI bus 109 connected to the hard disk drive 102.

Therefore, in the present embodiment, through the irregular rewriting of the buffer positions, specifically by changing the starting address of the buffers through rewriting of the program code using DMA transfer, it is made difficult to steal the information by "peeping" into the buffers.

In the secret-number communication in (4), the secure module 150 shown in FIG. 3 writes data, such as a first secret number, into a certain area of the secure software 180.

The secure software 180 confirms this data, and returns a suitable number to the secure module 150. Using this procedure, the secure module 150 can confirm the security of the secure software 180.

The secret number may be a sequence number or text information, in addition to being a single number. It is a matter of course that only the secure module 150 and the secure software 18 know this secret number. In order to avoid the risk of this number being analyzed by "peeping", the secure module 150 updates the secret number each time.

In the secret-number communication, when the secure module 150 writes the data into the memory area of the secure software 180, this area has a risk of being "peeped" into.

Therefore, in the present embodiment, to avoid this risk, the memory spaces 152A and 152B are provided in the secure module 150, thereby making it possible to read a normal value at a first reading time but a different value (such as "0", for example) at a second reading time. The secure module 150 and the secure software 180 exchange data with each other via these memory spaces 152A and 152B.

Further, in the present embodiment, the secure module 150 and the secure software 180 exchange information of decoding keys and encryption keys with each other, by utilizing the memory space 152B from which a normal value is read at the first reading time and "0" is read at the second reading time. As a matter of course, it is possible to utilize the memory spaces 152A and 152B to transmit information other than the encryption keys.

Figure 4:
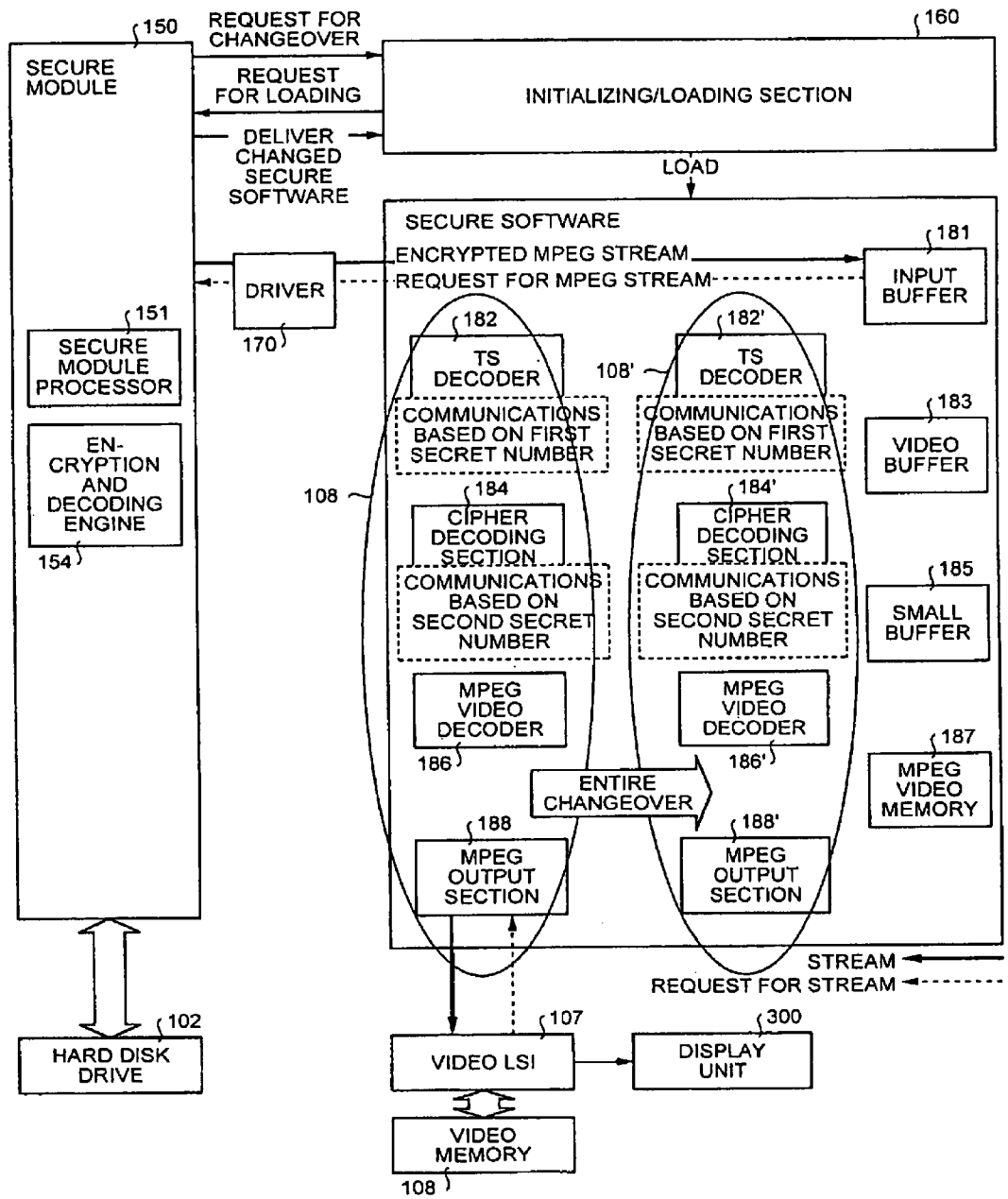
FIG. 4 is a block diagram that explains about a secure function when all secure software in the personal computer 100 are changed over.

FIG. 4 explains about the secure function during the normal operation of the secure software 180 that is loaded on the main memory 106 of the personal computer 100 shown in FIG. 1. In this process, the initializing/loading section 160 is used to change over all the components of the secure software 180 in the personal computer 100, to those of another secure software 180' (that includes a TS decoder 182', a cipher decoding section 184', an MPEG video decoder 186', an MPEG output section 188', etc.).

During this changeover, for a certain period of time, the secure software 180 that is before the changeover and the secure software 180' that is after the changeover exist at the same time in the main memory 106.

When the secure software 180 is stopped in the middle of the operation, there is a risk that the MPEG video reproduction is interrupted. Therefore, to avoid this risk, the secure software 180 and the secure software 180' coexist during a certain period of time.

When the initializing/loading section 160 loads the secure software 180' onto the main memory 106 after deleting the secure software 180 from the main memory 106, this loading takes time, and the MPEG video reproduction is stopped.

In order to avoid this problem, before deleting the secure software 180, the initializing/loading section 160 loads the secure software 180' onto the main memory 106 in advance. With this arrangement, it is possible to shorten the time taken to shift from the secure software 180 to the secure software 180'.

At the time of changing over the secure software from the secure software 180 to the secure software 180', it is also necessary to hand over the buffer areas used by the secure software 180 to the secure software 180'.

For example, in FIG. 2 and FIG. 3, there is a possibility that the encrypted MPEG video information of a few second component is kept stored in the video buffer 183, and that the video information of four frames, that is, a four-thirtieth second (approximately 133 millisecond) component, is kept stored in the MPEG video memory 187.

It is not possible to know how much second component of the encrypted MPEG video information is kept stored in the video buffer 183, unless the MPEG video decode processing is executed.

This is because a data compression ratio depends on the type of video. When a video can be compressed easily, it is possible to accumulate a large quantity of this video. On the other hand, when a video has a poor compression ratio (i.e., a video having a large component of a motion picture, which needs sequential updating), only a small portion of this video can be stored in the video buffer 183. Therefore, in the present embodiment, the secure software 180' needs to obtain the buffer information in the middle of the processing from the secure software 180.

The reason for using the initializing/loading section 160 to change over (i.e., change the components of) the secure software 180 is as follows. The secure module 150 directly writes data into the secure software using DMA transfer thereby to change the components in real time.

However, according to this method, only a part of the secure software is changed, and it is difficult to change the whole secure software. In order to change all the components of the secure software, it is necessary to use the initializing/loading section 160.

Specifically, the secure module 150 issues a secure software changeover request to the initializing/loading section 160. The initializing/loading section 160 requests the secure module 150 to load the secure software. At the request of the initializing/loading section 160, the secure module 150 transfers the changed secure software 180' to the initializing/loading section 160, in a similar manner to that explained above.

The secure module 150 issues the first changeover request to the initializing/loading section 160 because it is more secure for the secure module 150 to issue this request than for the initializing/loading section 160, that is near the operation system, to issue this request. With this arrangement, the operating system cannot know when the secure software has been changed over.

The initializing/loading section 160 finds an unswappable free memory area on the personal computer 100, and loads the secure software 180' onto the main memory 106.

The secure module 150 controls the changeover, for example, by writing a special number into a certain memory space in the secure software.

The control is then shifted from the secure software 180 to the secure software 180'. In shifting the control, it is necessary to shift the control of the buffer memory space that has been used by the secure software 180 to the secure software 180'.

For that purpose, following steps are executed.

(1) The secure module 150 issues a changeover request signal to the initializing/loading section 160.

(2) The initializing/loading section 160 requests the secure module 150 for the secure software 180'.

(3) The secure module 150 delivers the secure software 180' to the initializing/loading section 160.

(4) The initializing/loading section 160 loads the secure software 180' onto the unswappable area in the main memory 106.

(5) Based on the above, the secure software 180 and the secure software 180' exist in parallel in the main memory 106.

(6) The secure module 150 issues a secure software changeover instruction to the secure software 180.

(7) The secure software 180 receives the secure software changeover instruction. In order to shift the control of the MPEG processing to the secure software 180' at a suitable timing, the secure software 180 waits for an end-of-video-display signal from the video LSI 107. When the video LSI 107 sends the end-of-video-display signal, the secure software 180 carries out the following processing.

(a) The secure software 180 notifies the secure software 180' of a starting address of the MPEG video memory 187, and other relevant information. for example, when the MPEG video memory 187 has four frames, the relevant information is the information on a kind of each MPEG frame (such as an I picture, a P picture, and a B picture), an updatable frame, and a video to be displayed in the next frame.

(b) The secure software 180 notifies the secure software 180' of a memory starting-address in the small buffer 185, and quantity of remaining data.

(c) The secure software 180 notifies the secure software 180' of a memory starting address in the video buffer 183, and quantity of remaining data.

(d) The secure software 180 notifies the secure software 180' of a memory starting address in the input buffer 181, and quantity of remaining data.

(e) The secure software 180 notifies the secure software 180' of the encryption key and the decoding key that are currently used.

(8) The secure software 180 shifts the control to the secure software 180'.

Figure 5:
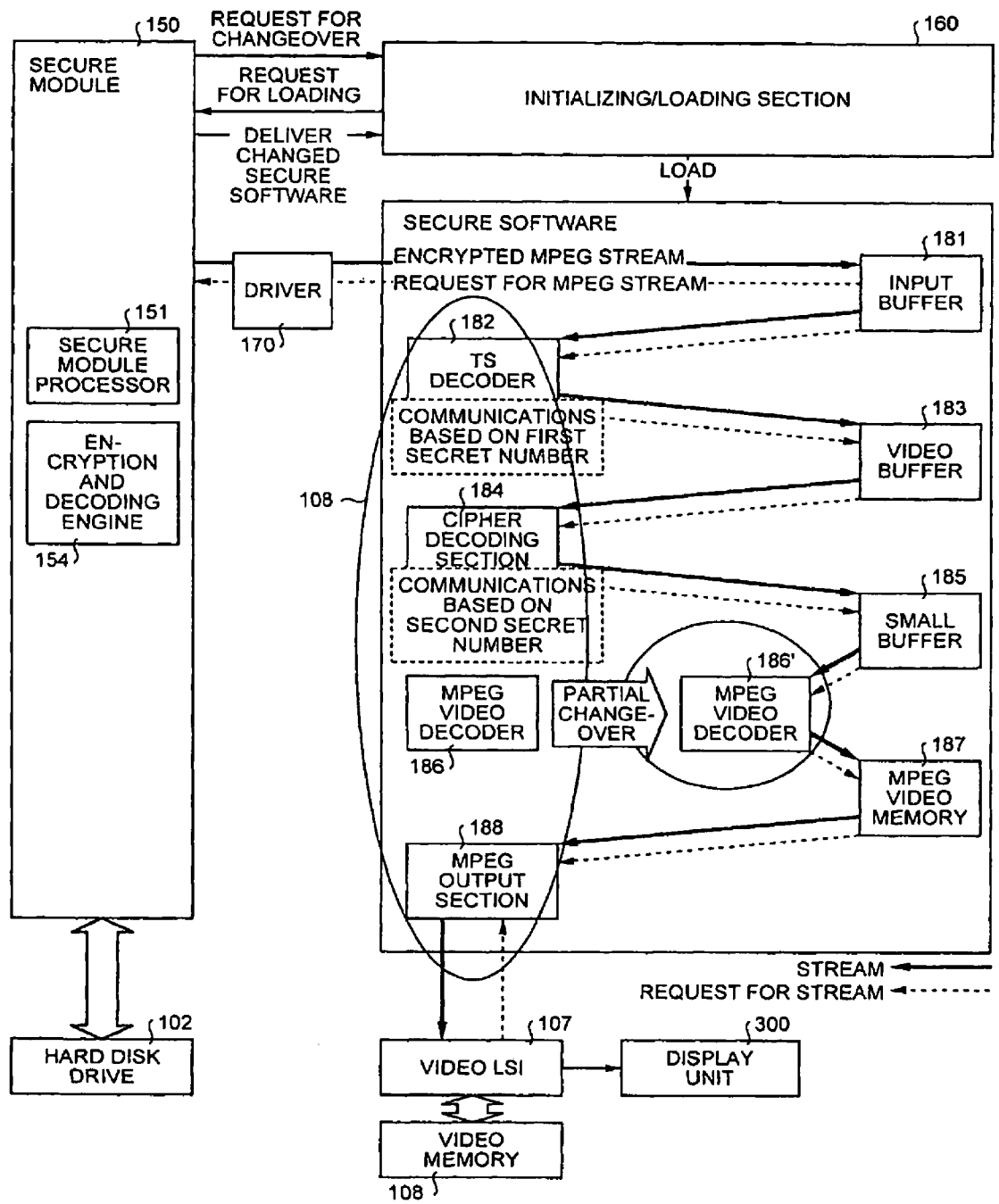
FIG. 5 is a block diagram that explains about a secure function when a part of secure software in the personal computer 100 is changed over.

FIG. 5 explains about the secure function during the normal operation of the secure software 180 that is loaded on the main memory 106 of the personal computer 100. In this process, the initializing/loading section 160 is used to change over a part of the secure software 180, for example, the MPEG video decoder 186, to other MPEG video decoder 186'.

While the changeover of all the components of the secure software 180 to the secure software 180' has been explained above with reference to FIG. 4, it is more practical to change over a part of the secure software 180 as shown in FIG. 5. In FIG. 5, as only a part of the secure software 180 is changed over, only a part of the buffers is changed over.

In this changeover, the operation that is the same as that in (1) to (5) for the changeover of all the components is carried out first. Thereafter, the following operation is carried out.

(6') The secure module 150 issues a secure software changeover instruction to the secure software 180.

(7') The secure software 180 receives the secure software changeover instruction. In order to shift the control of the MPEG video decoder 186 to the MPEG video decoder 186' at a suitable timing, the secure software 180 waits for an end-of-video-display signal from the video LSI 107. When the video LSI 107 sends the end-of-video-display signal, the secure software 180 carries out the following processing.

(a') The secure software 180 notifies the MPEG video decoder 186' of a starting address of the MPEG video memory 187, and other relevant information. for example, when the MPEG video memory 187 has four frames, the relevant information is the information on a kind of each MPEG frame (such as an I picture, a P picture, and a B picture), an updatable frame, and a video to be displayed in the next frame.

(b') The secure software 180 notifies the MPEG video decoder 186' of a memory starting-address in the small buffer 185, and quantity of remaining data.

(8') The secure software 180 builds the MPEG video decoder 186' into the main memory 106 as a formal MPEG video decoder in place of the MPEG video decoder 186, and starts processing.

It is not necessary to change over the video buffer 183 and the input buffer 181, as these buffers are not directly relevant to the MPEG video decoder 186.

As explained above, according to the present embodiment, the secure module 150 shown in FIG. 3 is provided. The secure module 150 directly accesses the main memory 106 in which the secure software 180 is stored, and the secure module 150 rewrites the program, changes the buffer positions, and executes the scan authentication. Therefore, it is possible to execute a secure software processing by adding hardware (i.e., the secure module 150) of a minimum limit to a device having an open architecture such as the personal computer 100.

Moreover, the secret information is stored in the memory space in such a manner that, correct information can be read from the memory only in the first attempt, and information other than the correct information can be read in second and later attempts. This provided a still more secure environment.

Figure 6:
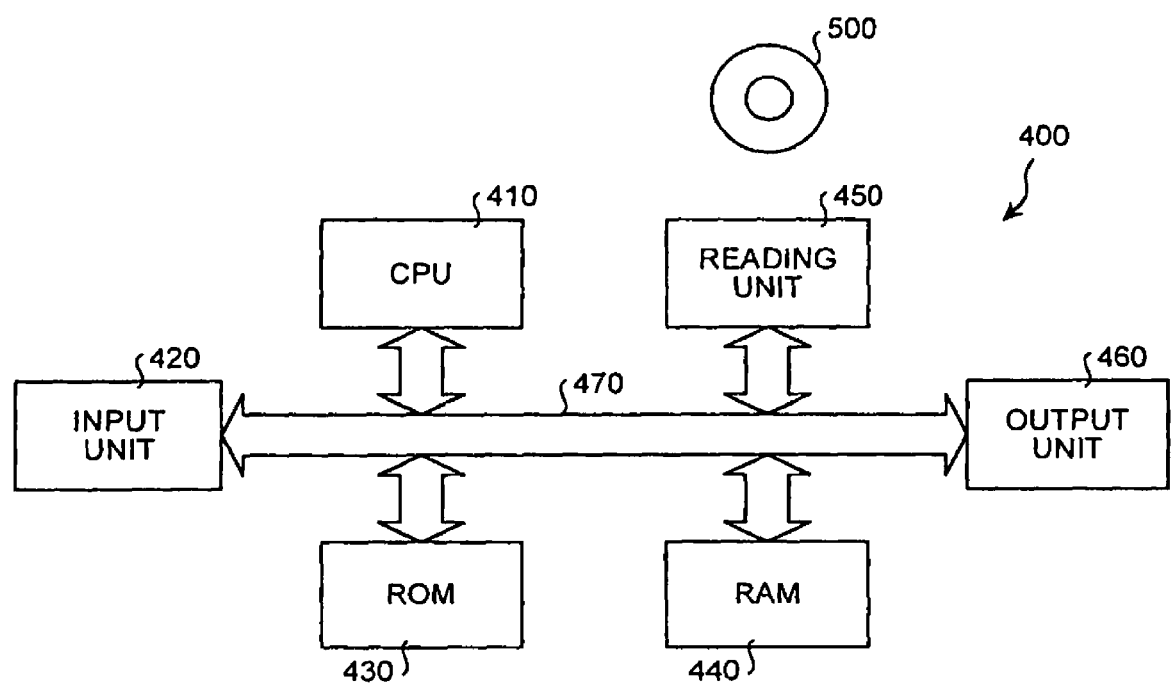
FIG. 6 is a block diagram of a modification of the system according to the embodiment.
Figure 7:
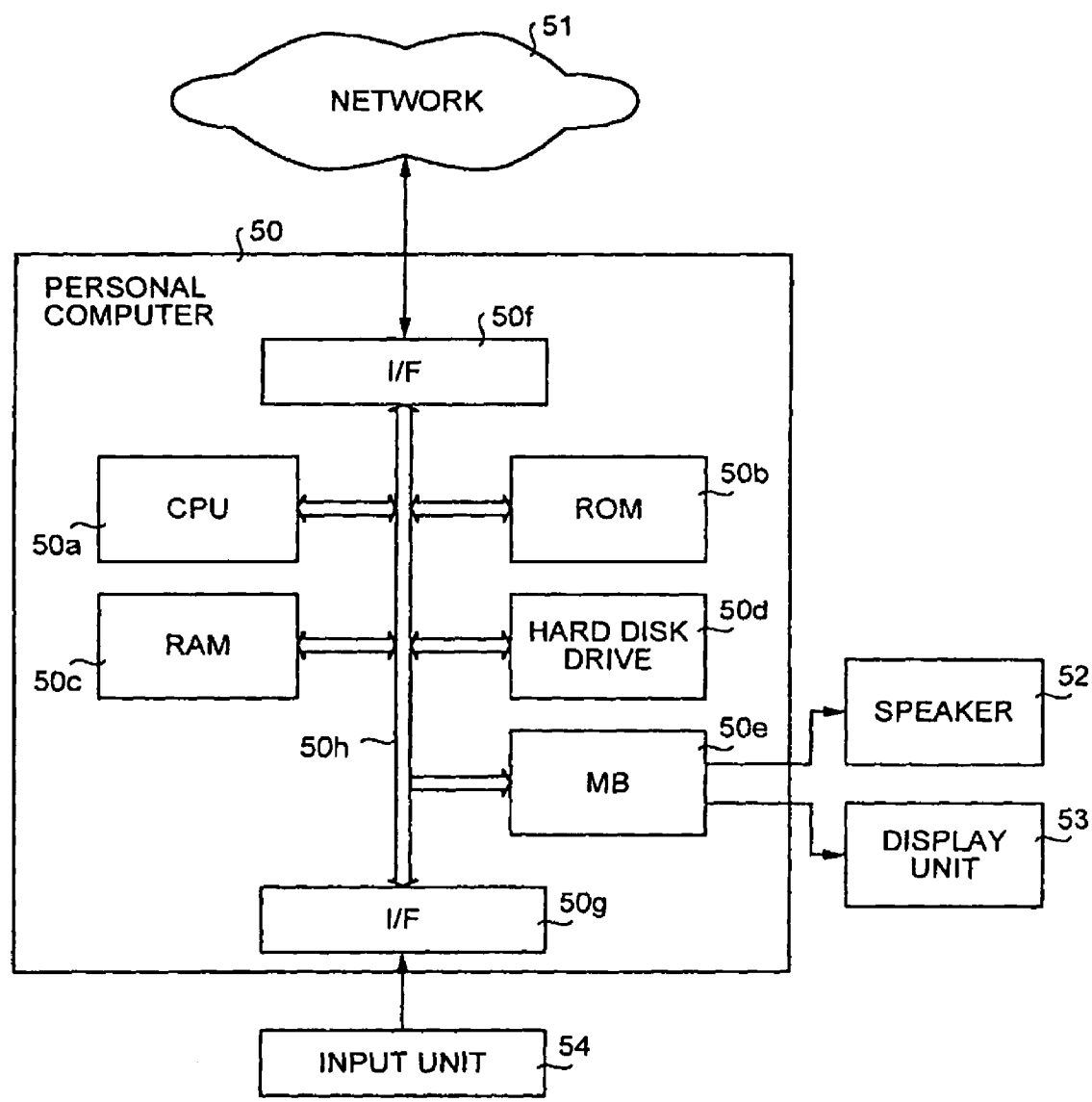
FIG. 7 is a block diagram of a conventional system.

The method according to the present embodiment may be realized on a computer shown in FIG. 6. A computer-readable recording medium 500 records a program that realizes the secure functions. A computer 400 reads the program recorded on the recording medium 500, and executes this program thereby to achieve each function.

The computer 400 includes a CPU 410 that executes the program, an input unit 420 such as a keyboard and a mouse, a ROM 430 that stores various kinds of data, a RAM 440 that stores operational parameters, a reading unit 450 that reads the program from the recording medium 500, an output unit 460 such as a display and a printer, and a bus 470 that connects these sections of the computer 400.

The CPU 410 reads the program recorded on the recording medium 500 via the reading unit 450, and executes the program, thereby to realize the above functions. The recording medium 500 includes an optical disk, a flexible disk, a hard disk, and the like.

Thus, according to the present invention, it is possible to execute a secure software processing by adding minimum hardware to a device having an open architecture such as a personal computer.

According to another aspect of the present invention, it is possible to provide a more secure environment.

According to still another aspect of the present invention, it is possible to avoid stopping the processing due to the updating of the information.

According to still another aspect of the present invention, it is possible to carry out an encryption or a decoding in the state of high security.

According to still another aspect of the present invention, when the falsification checking unit has detected a falsification, the key managing unit stops supplying the key. Therefore, it is possible to minimize a damage due to the falsification.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information reproducing apparatus, comprising:
    a secure module that stores a first information, wherein the secure module can not be accessed from outside the information reproducing apparatus;
    a memory that stores a second information in an unswappable area thereof, wherein the memory can be accessed from outside the information reproducing apparatus;
    a first falsification checking unit that is loaded on the secure module, wherein the first falsification checking unit is arranged to read the second information from the memory by direct access, to compare the second information with the first information in the secure module, and to check a falsification of the second information based on a result of the comparison;
    a writing unit that is loaded on the secure module, wherein the writing unit reads out a secret information stored in a controlled memory space within in the secure module and writes the secret information into the memory as a part of the second information checked by the first falsification checking unit using a direct access method; and
    a second falsification checking unit that is loaded on the secure module, wherein the second falsification checking unit checks the falsification of the second information by confirming whether a response information corresponding to the secret information written by the writing unit is returned from the second information, and
    wherein the controlled memory space is such that a stored information is read out from the memory space at a first time and a stored information different from the stored information is read out at a second time.

2. A secure module mounted to an information reproducing apparatus, comprising:
    a reading unit for reading a second information from an unswappable area in a memory mounted to an information reproducing apparatus, by direct access, the memory can being accessible from outside the information reproducing apparatus;
    a first falsification checking unit that compares the second information with a first information stored in the secure module, the first information being not accessible from outside the information reproducing apparatus, and checks a falsification of the second information based on a result of the comparison; and
    a writing unit that that reads out a secret information stored in a controlled memory space stored within the secure module and writes the secret information into the memory as a part of the second information checked by the first falsification checking unit using a direct access method; and
    a second falsification checking unit that checks the falsification of the second information by confirming whether a response information corresponding to the secret information written by the writing unit is returned from the second information, and
    wherein the controlled memory space is such that a stored information is read out from the memory space at a first time and a stored information different from the stored information is read out at a second time.

* * * * *

UNITED STATES PATENT AND TRADEMARK OFFICE
CERTIFICATE OF CORRECTION

| | | |
|---|---|---|
| PATENT NO. | : 7,930,562 B2 | Page 1 of 1 |
| APPLICATION NO. | : 11/980655 | |
| DATED | : April 19, 2011 | |
| INVENTOR(S) | : Kohiyama et al. | |

It is certified that error appears in the above-identified patent and that said Letters Patent is hereby corrected as shown below:

Claim 1, Column 17, line 42, change "within in" to --within--.

Claim 2, Column 18, line 27, delete "that" (second occurrence).

Signed and Sealed this
Fifth Day of July, 2011

David J. Kappos
*Director of the United States Patent and Trademark Office*